J. L. SOMMER.
NAIL FILE.
APPLICATION FILED JAN. 20, 1912.
1,030,492.
Patented June 25, 1912.
Fig. 1.
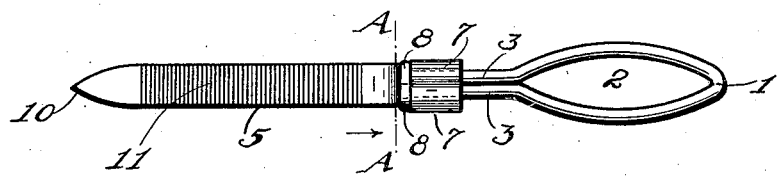
Fig. 2.
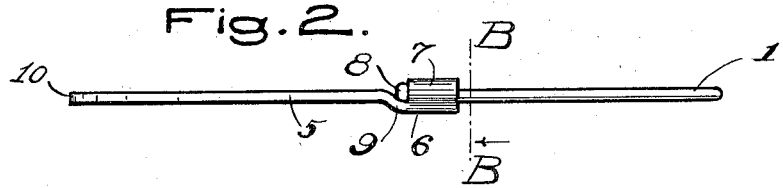
Fig. 3.
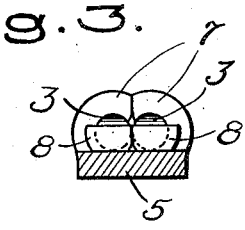
Fig. 4.
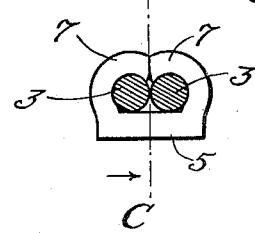
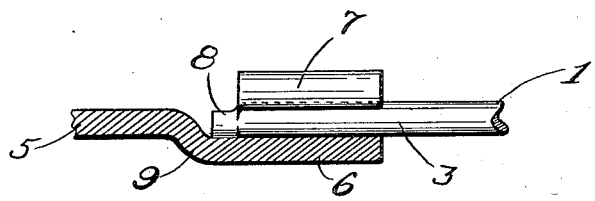
Fig. 5.
WITNESSES
Cornelius Zabriskie.
Howard P. King.
INVENTOR:
John L. Sommer,
BY Russell M. Everett,
ATTORNEY.
COLUMBIA PLANOGRAPH CO., WASHINGTON, D. C.

UNITED STATES PATENT OFFICE.

JOHN L. SOMMER, OF NEWARK, NEW JERSEY, ASSIGNOR TO J. L. SOMMER MANUFACTURING CO., A CORPORATION OF NEW JERSEY.

NAIL-FILE.

1,030,492.

Specification of Letters Patent. Patented June 25, 1912.

Application filed January 20, 1912. Serial No. 672,467.

*To all whom it may concern:*

Be it known that I, JOHN L. SOMMER, a citizen of the United States, residing at Newark, in the county of Essex and State of New Jersey, have invented certain Improvements in Nail-Files, of which the following is a specification.

This invention relates more particularly to nail-files having a flat blade and doubled wire handle, and in fact relates to any tool or implement having those or equivalent members.

I have illustrated the invention in connection with a nail file, but do not wish to be understood as restricting myself at all by having done so, as it can be used in many tools or implements having similar members.

The invention relates especially to the connection of blade and handle to each other, without regard to the particular purpose or use to which said members are adapted or intended.

The objects of the invention are to enable the flat blade and doubled wire handle of a tool or implement to be cheaply and firmly connected, so that relative movement can be prevented; to secure a neat and pleasing appearance, and to obtain other advantages and results as may be brought out in the following description.

Referring to the accompanying drawings, in which like numerals of reference indicate the same parts throughout the several figures, Figure 1 is a plan of a nail-file embodying my invention; Fig. 2 is an edge view of the same; Fig. 3 is a cross-section on line A—A, Fig. 1, looking in the direction indicated by the arrow; Fig. 4 is a section on line B—B of Fig. 2, looking in the direction of the arrow, and Fig. 5 is a longitudinal section on line C—C of Fig. 4, looking in the direction of the arrow.

In the specific embodiment of the invention shown in said drawings, 1 indicates the wire handle, preferably bent in an elongated loop 2 with the ends 3, 3 brought into parallel and adjacent relation to lie side by side.

5 represents the blade used in connection therewith, and which has at one end 6, opposite laterally projecting ears 7, 7 adapted to be curled over the adjacent ends 3, 3 of the handle. Such bending of the ears brings the ends thereof into abutting relation, and firmly holds the said handle to the blade. It will be noted that the ends of the blade 7, 7 are turned downward into the crevice between the wires 3, 3, preferably.

The extremities 8, 8 of the handle ends 3, 3, which project past the ears 7, 7, are headed or upset, as shown, which insures the handle and blade from drawing apart. In order to prevent a collapsing, or inward movement of the handle toward the blade, I have offset the blade, as at 9, the shoulder of such offset engaging the heads 8, 8 to retain the same against any such movement. The offset furthermore brings the handle and blade in mutual alinement.

In order to increase the usefulness of the device, I point the opposite end of the blade, as represented at 10, that it may be used to perform such services as cleaning one's finger nails. The blade also has a finely corrugated or roughened surface 11, as usually employed on a file, to smooth and file the finger nails, and the wire handle 1 preferably constitutes a collar buttoner, as shown.

Having thus described the invention, what I claim is:

In an implement of the character described, the combination of a wire handle having end portions arranged side by side and their extremities headed, of a blade overlapping said end portions and having opposite lateral ears bent over said wires back of the headed extremities, said blade having a lateral offset adjacent to said headed extremities of the handle forming a shoulder to engage said extremities and prevent their movement away from the ears and bringing the outer portion of the blade into substantial alinement with said handle.

JOHN L. SOMMER.

Witnesses:
CORNELIUS ZABRISKIE,
FRANCES E. BLODGETT.

---

Copies of this patent may be obtained for five cents each, by addressing the "Commissioner of Patents, Washington, D. C."